UNITED STATES PATENT OFFICE.

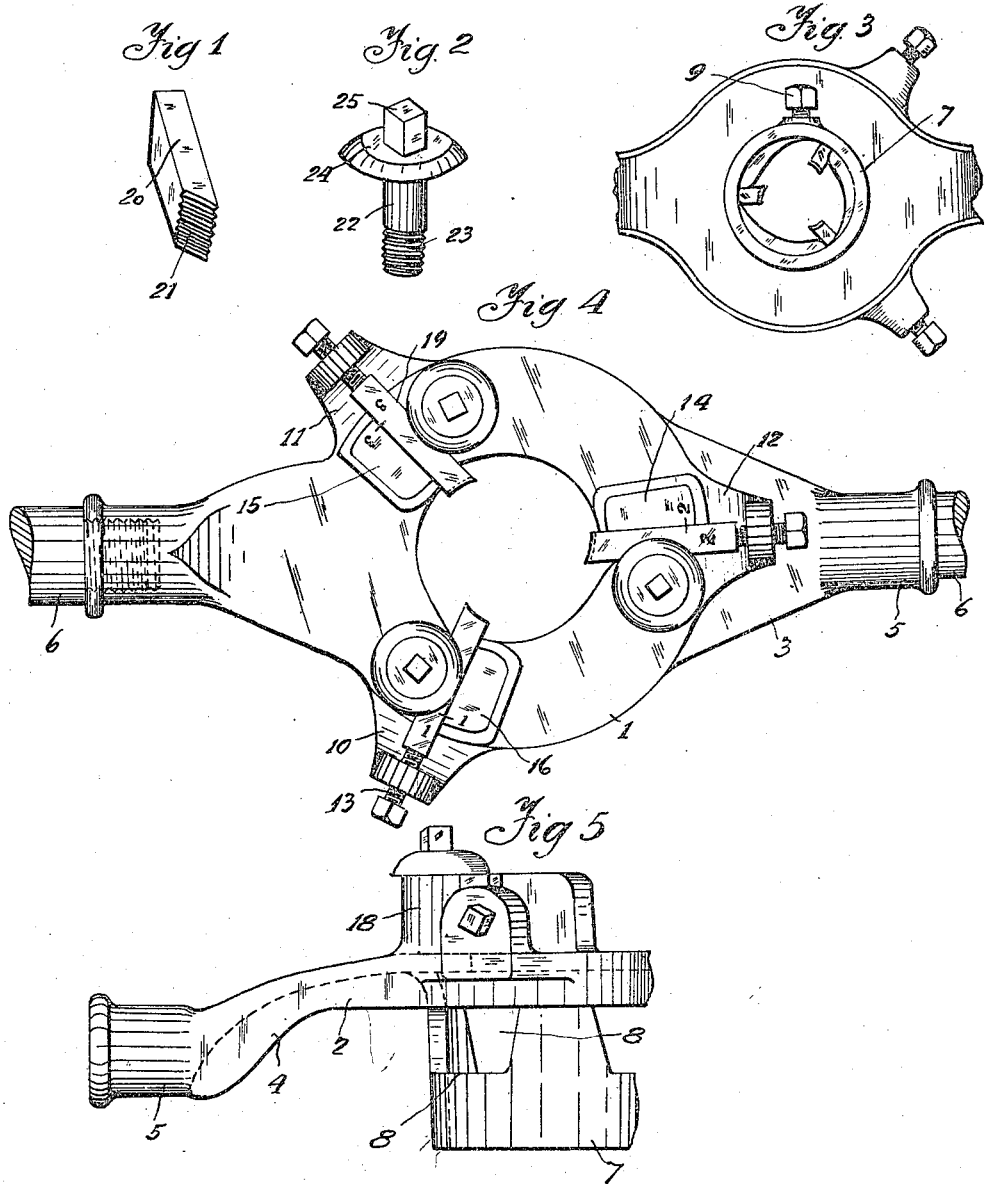

ARTHUR J. STEFFENBERG, OF PITTSBURGH, PENNSYLVANIA.

PIPE-THREADING DIE.

1,241,048.        Specification of Letters Patent.    Patented Sept. 25, 1917.

Application filed February 26, 1916. Serial No. 80,644.

*To all whom it may concern:*

Be it known that I, ARTHUR J. STEFFENBERG, a citizen of the United States, residing at Pittsburgh, in the county of Allegheny and State of Pennsylvania, have invented certain new and useful Improvements in Pipe-Threading Dies, of which the following is a specification.

This invention relates to a pipe threading die and has for its object to provide, in a manner as hereinafter set forth, a die of such class for threading metallic pipe capable of starting readily and cutting the threads perfectly.

A further object of the invention is to provide a pipe threading die, in a manner as hereinafter set forth, with three cutters capable of self-centering and to further provide the die with three cutters so that the cutting teeth thereof are always equally spaced and further find their own arrangement thus cutting perfectly and evenly all edges.

A further object of the invention is to provide, in a manner as hereinafter set forth, a pipe threading die having the cutters so supported that the chips, formed during the cutting operation, cannot clog or jam against the sides of the cutters and further to permit of the chips having perfect freedom to curl thus providing an easy operating cutting die and thus preventing tearing of the threads on the pipe and the breaking of the cutting teeth of the cutters.

A further object of the invention is to provide a pipe threading die, in a manner as hereinafter set forth, having three cutters constructed in a manner so that they can be redressed four or five times easily and cheaply and further that the cutters can be ground very handily by placing angle on the side of emery wheel.

Further objects of the invention are to provide a pipe threading die which is simple in its construction and arrangement, strong, durable, capable of cutting threads in a perfect manner with a little power, readily set up, convenient in its use, having self-centering cutters, and inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a perspective view of one of the cutters.

Fig. 2 is a perspective view of one of the cutter holding down members.

Fig. 3 is an elevation of the threading die in accordance with this invention, broken away.

Fig. 4 is a top plan view of a pipe threading die in accordance with this invention.

Fig. 5 is a side elevation, broken away.

Referring to the drawings in detail 1 denotes the body portion of the die which is annular in contour and formed with diametrically opposed and rearwardly curved extensions 2, 3, which taper downwardly as at 4 and terminate in sockets 5 to receive handle bars 6.

Formed integral with one side of the body portion 1 is a collar 7, cut away to form openings 8 for the passage of chips. The collar 7 carries a set screw 9, for the ordinary bushing used in connection with pipe threading dies.

Projecting laterally from the body portion 1 is a series of angle-shaped brackets 10, 11, 12 and the vertical arm of each of said brackets is provided with an opening having a threaded wall and extending through the openings and engaging with the threads of the walls thereof are cutter adjusting screws 13. The brackets 10, 11 and 12 are equally spaced with respect to each other.

Formed integral with the body portion 1, to that side opposite the side with which the collar 7 is integral, is a series of abutments 14, 15 and 16, which are equally spaced with respect to each other and the inner side face of each of said abutments is plane and extends at an inclination as at 17 and at a greater inclination than the outer side face. The abutments are radially disposed. Arranged opposite each of the abutments, as well as being spaced therefrom, is an abutment 18 and which in connection with that abutment which it opposes provides a channel 19 in which is adjustably mounted a cutter 20 having a beveled inner end provided with cutting teeth 21. The inner side face of the abutment 18 is plane and extends at a greater inclination than the outer side face of said abutment. The abutment 18 in connection with the abutments 14, 15, 16 provide pairs of abutments and the opposed faces of the abutments, which are the inner side faces are arranged in parallelism.

Detachably engaging in the abutments 18 are holding members for maintaining the cutters 20 against vertical movement within the channels 19. Each of the holding members consists of a shank 22, having a portion thereof threaded as at 23 and an enlarged head 24, having a square projection 25. The heads 24, when the holding members are positioned overlap the cutters 20 and maintain them in the channels 19.

The channels 19 are equally spaced with respect to each other and extend at an inclination and the plane of said channels is eccentric with respect to the center of the body portion 1.

The cutters are adjusted through the medium of screws 13.

What I claim is:—

1. A pipe threading die comprising a body portion in the form of an annulus, pairs of transversely extending, eccentrically disposed and forwardly projecting abutments integral with the forward face of said annulus, said pairs of abutments being spaced from each other, the abutments of each pair spaced to provide a channel inclining with respect to the sides of the abutments of the pair and further disposed in a plane eccentric with respect to the center of the annulus, cutters supported upon the forward face of the annulus within said channels, means extending in the forward face of the abutment of each pair and over-lapping a cutter for maintaining it against the annulus, spaced L-shaped brackets projecting laterally from the outer edge of the annulus and each having a horizontal and lateral arm, said longitudinal arm flushed with the forward face of the annulus and said horizontal arm extending forwardly from the annulus and spaced from and opposing the outer ends of a pair of abutments, and means carried by said horizontal arms abutting against the outer ends of the cutters forward of the annulus for adjustably shifting them inwardly and across the forward face of the annulus.

2. A pipe threading die comprising a body portion in the form of an annulus, pairs of transversely extending, eccentrically disposed and forwardly projecting abutments integral with the forward face of said annulus, said pairs of abutments being spaced from each other, the abutments of each pair spaced to provide a channel inclining with respect to the sides of the abutments of the pair and further disposed in a plane eccentric with respect to the center of the annulus, cutters supported upon the forward face of the annulus within said channels, means extending in the forward face of the abutment of each pair and over-lapping a cutter for maintaining it against the annulus, spaced L-shaped brackets projecting laterally from the outer edge of the annulus and each having a horizontal and lateral arm, said longitudinal arm flushed with the forward face of the annulus and said horizontal arm extending forwardly from the annulus and spaced from and opposing the outer ends of a pair of abutments, and means carried by said horizontal arms abutting against the outer ends of the cutters forward of the annulus for adjustably shifting them inwardly and across the forward face of the annulus, and a pair of diametrically opposed and rearwardly curved extensions integral with the outer edge of the annulus and each having its outer end terminating in a pocket for the reception of a handle bar.

3. A pipe threading die comprising a body portion, pairs of transversely extending, eccentrically disposed and forwardly projecting abutments integral therewith, an abutment of each pair spaced to provide a channel inclining with respect to the sides of the abutments of a pair and further disposed in a plane eccentric with respect to the center of the annulus, cutters mounted in said channels, means extending in the abutment of each pair for maintaining the cutters in position, and means supported exteriorly of the body portion and abutting against the outer ends of the cutters for adjustably shifting these latter inwardly.

In testimony whereof I affix my signature in the presence of two witnesses.

ARTHUR J. STEFFENBERG.

Witnesses:
T. M. McLENAHAN,
JAMES AUSTIN.

Copies of this patent may be obtained for five cents each, by addressing the "Commissioner of Patents, Washington, D. C."